United States Patent
Srinivasan et al.

(10) Patent No.: US 11,500,719 B1
(45) Date of Patent: Nov. 15, 2022

(54) RELIABILITY IMPROVEMENTS FOR MEMORY TECHNOLOGIES

(71) Applicant: Amazon Technologies, Inc., Seattle, WA (US)

(72) Inventors: Charan Srinivasan, San Jose, CA (US); Nafea Bshara, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/835,794

(22) Filed: Mar. 31, 2020

(51) Int. Cl.
 *G06F 11/10* (2006.01)
 *G06F 3/06* (2006.01)

(52) U.S. Cl.
 CPC ........ *G06F 11/1068* (2013.01); *G06F 3/0619* (2013.01); *G06F 3/0659* (2013.01); *G06F 3/0673* (2013.01)

(58) Field of Classification Search
 CPC .. G06F 11/1068; G06F 3/0619; G06F 3/0659; G06F 3/0673
 See application file for complete search history.

(56) References Cited

U.S. PATENT DOCUMENTS

| | | | | |
|---|---|---|---|---|
| 4,433,388 A * | 2/1984 | Oosterbaan | ......... | G06F 11/1012 365/200 |
| 9,183,085 B1 * | 11/2015 | Northcott | ............ | G06F 11/1012 |
| 10,089,174 B2 * | 10/2018 | Yang | .................... | G11C 7/1006 |
| 10,991,443 B2 * | 4/2021 | Iwai | ..................... | G06F 11/1068 |
| 2009/0254776 A1 * | 10/2009 | Gonzalez | ............ | G06F 11/1068 714/E11.038 |
| 2011/0202818 A1 * | 8/2011 | Yoon | .................... | G06F 11/1068 714/773 |
| 2011/0302477 A1 * | 12/2011 | Goss | .................. | G11C 16/0483 714/773 |
| 2014/0047300 A1 * | 2/2014 | Liang | .................. | G06F 11/1008 714/766 |
| 2014/0344643 A1 * | 11/2014 | Hughes, Jr. | ......... | G06F 11/1008 714/763 |
| 2015/0149857 A1 * | 5/2015 | Motwani | ................ | H03M 13/05 714/763 |
| 2015/0332777 A1 * | 11/2015 | Yoon | .................. | G11C 16/0466 714/764 |
| 2015/0378801 A1 * | 12/2015 | Navon | ................. | G11C 16/349 714/704 |
| 2016/0124668 A1 * | 5/2016 | Inbar | ................... | G06F 12/0246 711/162 |
| 2017/0060450 A1 * | 3/2017 | Roberts | ............... | G06F 11/2058 |
| 2017/0201273 A1 * | 7/2017 | Bonke | ................. | G06F 11/1068 |
| 2018/0018231 A1 * | 1/2018 | Okada | ..................... | G06F 3/064 |
| 2020/0135292 A1 * | 4/2020 | Kim | ....................... | G11C 29/783 |
| 2020/0250031 A1 * | 8/2020 | Li | ........................ | G06F 11/1068 |

* cited by examiner

*Primary Examiner* — Guy J Lamarre
(74) *Attorney, Agent, or Firm* — Kilpatrick Townsend & Stockton LLP

(57) ABSTRACT

To improve the reliability of a memory system, data and error correction codes associated with the data can be stored in a first memory. Parity bits calculated over data bits in the first memory can be stored in a second memory. The parity bits in the second memory can be used to recover errors that are uncorrectable by the error correction codes. The first memory can be implemented, for example, using an emerging memory technology, while the second memory can be implement using a different memory technology.

16 Claims, 9 Drawing Sheets

RELIABILITY IMPROVEMENTS FOR MEMORY TECHNOLOGIES

BACKGROUND

The reliability of prevalent memory technologies such as static random access memory (SRAM), dynamic random access memory (DRAM), flash memory, and the like are fairly well understood, because such memory technologies have been commercially available and widely used in the field. As memory technology evolves, new types of storage devices are becoming available. For example, 3D crosspoint (3DXP), which is a type of phase-change memory that stores information based on changing the resistance of the bulk material, has emerged to be a promising new memory technology that has faster access times than conventional flash memories and is more cost effective than conventional DRAMs. Other emerging memory technologies may include, but not limited to, resistive random access memory, spin-transfer torque magnetic random access memory (STT MRAIVI), or other advance memory technologies, etc. Because such emerging memory technologies may not yet have been widely deployed in the field, the reliability and behavior of such new technologies over time may not be as well understood as other more commonplace memory technologies.

BRIEF DESCRIPTION OF THE DRAWINGS

Various embodiments in accordance with the present disclosure will be described with reference to the drawings, in which.

DETAILED DESCRIPTION

Figure 1:
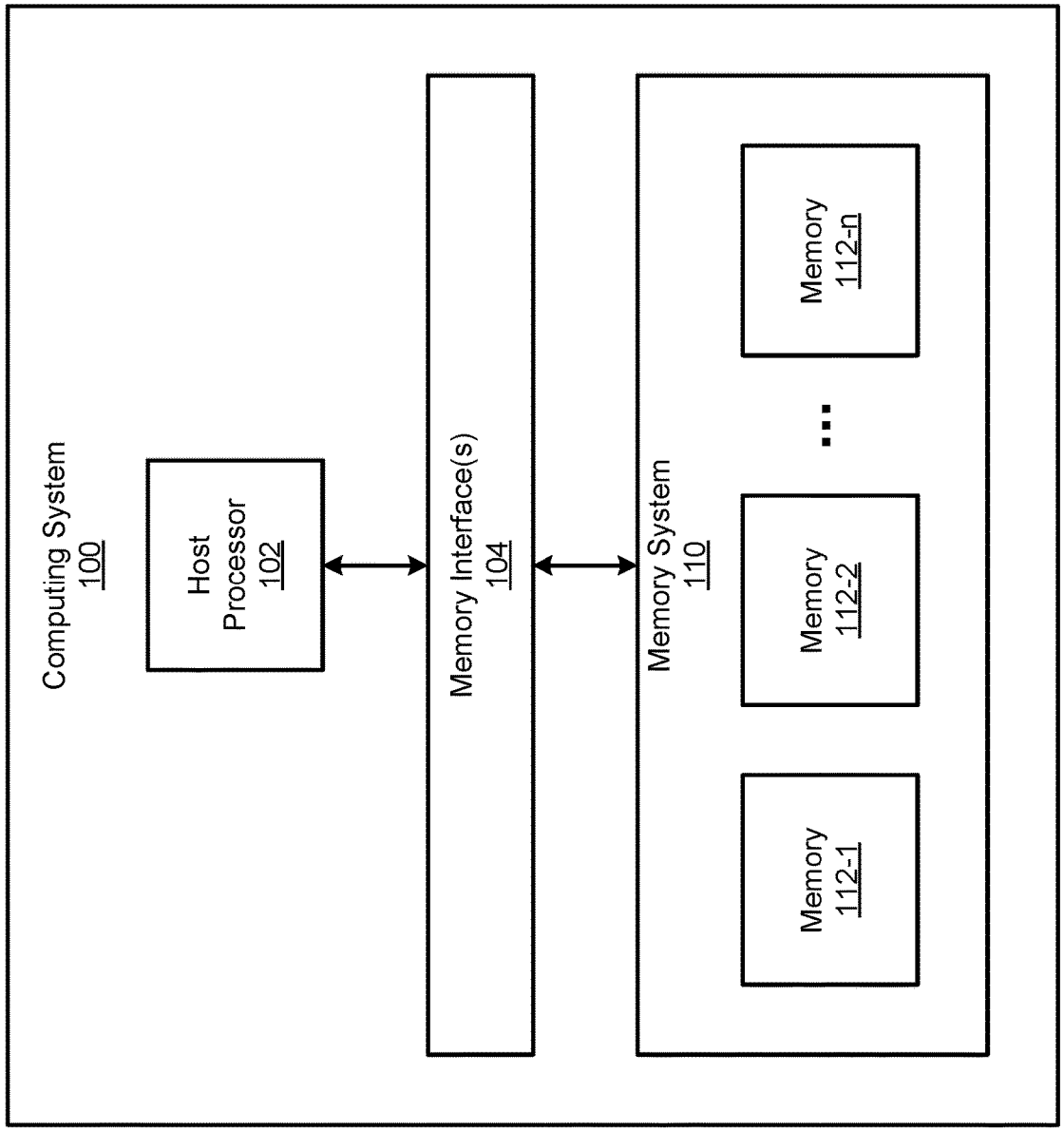
FIG. 1 illustrates a simplified block diagram of an example of a computing system.

Errors in memory devices can occur for various reasons. A defect or improper operating condition (e.g., voltage, temperature, excessive access cycles, etc.) can cause a read or a write to a memory to fail. Soft errors can also occur when particles or radiation interact with the memory device. In high reliability systems, error detection and correction mechanisms such as error correction codes (ECC) can be employed to mitigate against errors and improve the reliability of the memory device. ECC can be used to correct a predetermined number of errors (e.g., single-bit errors). However, when the number of bit errors exceed the capability of the ECC, the error can be detected but cannot be recovered. While ECC can be effective in improving the reliability of mature memory technologies, some technologies, such as emerging memory technologies, can benefit from additional safeguards against failures. For example, the failure mechanism of an emerging memory technology may not be fully understood, and it's possible that certain technologies may be more prone to die defects causing errors that are uncorrectable with ECC.

To increase the reliability of a memory device, additional parity protection can be employed together with ECC, such that errors uncorrectable with ECC can be recovered using the parity protection. For example, in a memory device having multiple channels, ECC can be used to protect data within each channel, and parity protection can be used to protect data across the multiple channels. The ECC can be stored together with the data protected by the ECC in the same memory channel, and the parity bits for the parity protection can be stored in a separate memory channel.

Storing data and parity protection in separate memory channels can provide various advantages. For example, such a memory arrangement enables the parity protection to be stored in a memory technology that is different than the memory technology used for data storage. In terms of emerging memory technologies, the parity protection can be stored using a more mature technology, while the data is stored with the newer technology. As compared to storing both the data and parity protection with the emerging technology, using a more mature technology to store the parity protection can provide better reliability because the mature technology can be less prone to defects causing corruption of the parity information.

Storing data and parity protection in separate memory channels can also improve memory access bandwidth. Inclusion of parity protection may require a memory write to perform two write operations—a first write operation to write the data, and a second write operation to write the parity bits. The flexibility to store the parity information in a separate memory channel may allow the parity information to be stored using a faster type of memory to reduce the overall access time to perform the two write operations, and hence improve the memory bandwidth. Even if the parity information is stored using the same type of memory, storing the parity information in a separate memory channel may allow the parity information to be written in parallel or in the background using a separate interface while the memory storing the protected data is being accessed.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a simplified block diagram of a computing system 100. Computing system 100 may include a host processor 102, a memory system 110, and memory interface(s) 104 that host processor 102 may use to access memory system 110. Computing system 100 may also include other components not specifically shown. For example, computing system 100 can include a network interface that computing system 100 may use to communicate with a network and/or other external devices. As another example, computing system 100 can include acceleration engines such as a graphics processing unit (GPU), direct memory access engine (DMA), etc. to offload specific tasks from host processor 102.

Host processor 102 is an integrated circuit device that is capable of executing program instructions. In some examples, host processor 102 can include multiple processing cores. A multi-core processor may include multiple processing units within the same processor. In some implementations, the computing system 100 can include more than one host processor 102. Host processor 102 may execute program code such as firmware, operating system, and/or application(s) that are stored in memory system 100. The program code executed by processor 102 may include operations to manage and access data (e.g., instructions, application data, etc.) to and from memory system 110.

Memory interface(s) 104 can include signals such as address, data, and control buses to provide components of computing system 100 access to memory system 110. Examples of memory interface(s) 104 may include dual in-line memory module interface (DIMM), serial advanced technology attachment interface (SATA), serial attached small computer system interface (SAS), peripheral component interconnect interface (PCI) and its derivatives such as PCI express (PCIe), or the like to communicate with memory system 110. In some implementations, memory interface(s) 104 may include standardized interfaces such as those described above, or proprietary interfaces used by a manufacturer of a component of computing system 100.

Memory system 100 may include one or more memory components 112-1 to 112-*n*. Memory components 112-1 to 112-*n* can include any combination of an individual memory die or memory chip, a chip package that includes multiple memory dies in a semiconductor chip, a memory module that contains multiple memory dies or memory chips on a printed circuit board or other types of substrate, an internal or external storage device such as a hard disk drive or a solid state drive that includes multiple memory dies or memory chips in a device housing, and the like. Memory components 112-1 to 112-*n* may include different types of memories including volatile and non-volatile memories. For example, memory components 112-1 to 112-*n* may include static random access memory (SRAM), dynamic random access memory (DRAM), flash memory, programmable read-only memory (PROM), electrically erasable programmable read-only memory (EEPROM), phase-change memory, magnetic storage medium, optical storage medium, and/or any combination thereof. In some implementations, one or more of memory components 112-1 to 112-*n* can be implemented using an emerging memory technology such as 3DXP. Memory system 100 may also include network attached storage (NAS) and/or storage arrays coupled over a storage area network (SAN).

Figure 2:
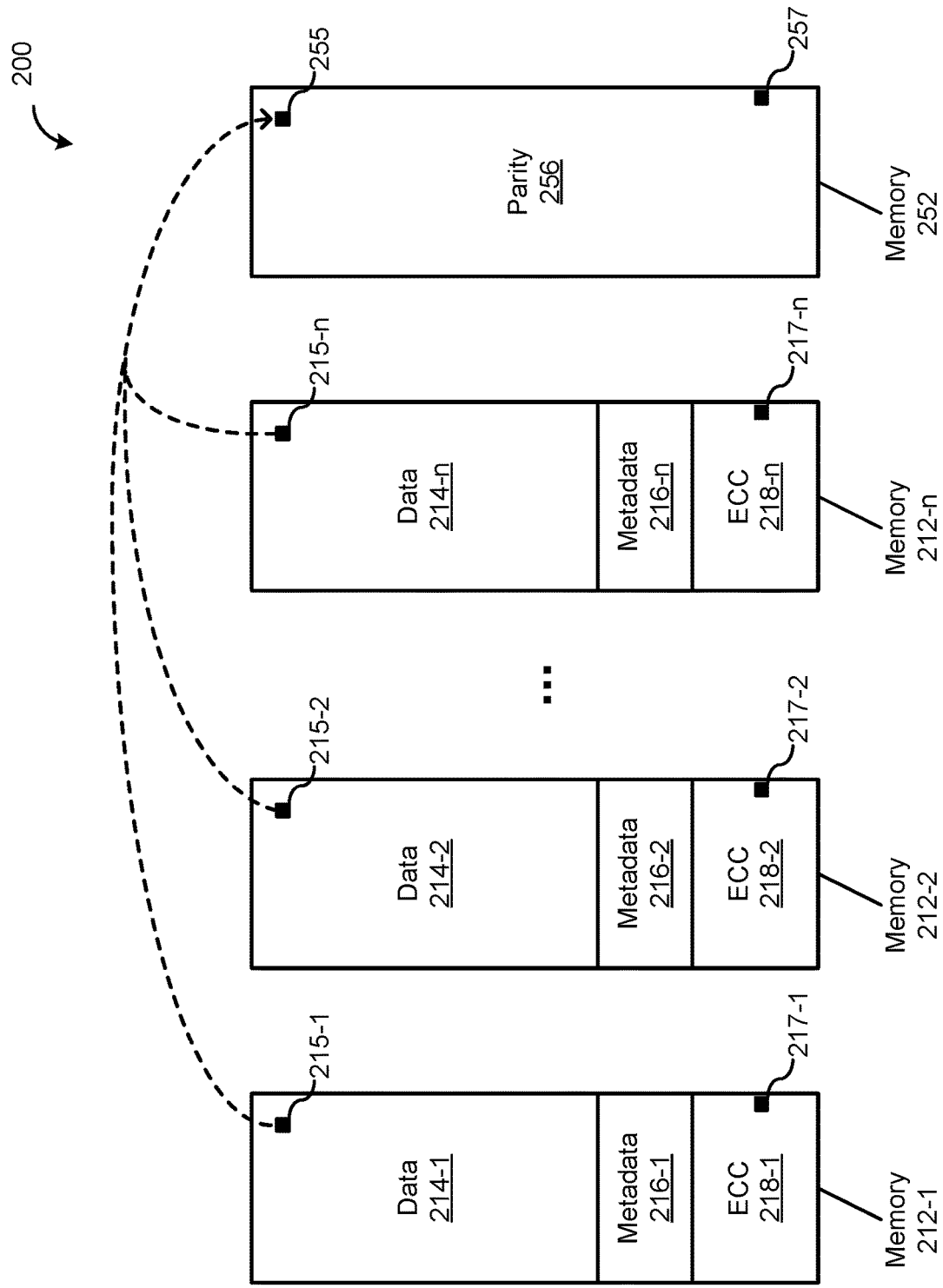
FIG. 2 illustrates a block diagram of an example of a memory system.

FIG. 2 illustrates a block diagram of a memory system 200, according to some implementations. Memory system 200 may include multiple data memory channels 212-1 to 212-*n*. For example, memory system 200 may include 7 data memory channels, 8 data memory channels, 15 data memory channels, 16 data memory channels, or other suitable number of data memory channels. Each of data memory channels 212-1 to 212-*n* can be implemented using a single memory device (e.g., a memory die or memory chip), or multiple memory devices. In some implementations, a data memory channel can be implemented as a single memory chip incorporating multiple memory dies.

Data memory channels 212-1 to 212-*n* can be used to store data for a computing system. The data may include application data, instruction code, and/or other information used or stored by a computing system. The data stored on a memory channel can be protected by error correction codes (ECC). For example, each 8-bit data word can be protected by a 5-bit ECC, each 16-bit data word can be protected by 6-bit of ECC, each 32-bit data word can be protected by a 7-bit ECC, each 64-bit data word can be protected by an 8-bit ECC, and so on. The number of bits in a data word and the number of ECC bits protecting the data word can be varied depending on the type of ECC used and the level of protection (e.g., the number of data bits correctable by the ECC). Examples of different types of ECC may include Hamming codes, Reed-Solomon codes, Bose-Chaudhuri-Hocquenghem codes, or other suitable error correction codes. Each bit in a ECC can be computed over a subset of the data bits that the ECC protects. When data is read from the memory, the ECC can be recomputed over the protected data and compared with the previously stored ECC. Depending on which of the ECC bits mismatches, the position of an error bit in the data read form the memory can be detected and corrected. When multiple of the ECC bits have a mismatch, the data read from the memory may contain multiple error bits. While such an error can be detected by the ECC, such multi-bit errors may not be recovered by using ECC alone. In some implementations, the number of bits correctable by the ECC can be increased by increasing the number of ECC bits used for a given set of data bits being protected.

Data memory channels 212-1 to 212-*n* may also store metadata associated with the data stored in memory system 200. The metadata may include address mapping information and memory status information such as whether a section of the memory contains valid data. The metadata may include other types of error detection information such as cyclic redundancy check information. In some implementations, for example, in a multi-tenant computing environment, the metadata may also include information identifying a user of the data, a source of the data, and/or an intended consumer of the data.

Referring to FIG. 2, data memory channel 212-1 may store data 214-1 and ECC 218-1 associated with data 214-1 in the same memory channel. In some implementations, data memory channel 212-1 may also optionally store metadata 216-1 associated with data 214-1. Similarly, data memory channels 212-2 to 212-*n* may store respective data 214-2 to 214-*n* and corresponding ECC 218-2 to 218-*n* with optional metadata 216-2 to 216-*n*. Although the ECC are shown in FIG. 2 as being stored in a specified region in each memory channel, in some implementations, the ECC can be stored in an interleaved manner with the data being protected by each ECC. Similarly, the optional metadata can be stored in an interleaved manner with the associated data and corresponding ECC. In some implementations, the ECC and/or metadata can be stored in a memory channel separate from the memory channel storing the associated data. For example, one or more memory channels can be designated for storing ECC and/or metadata associated with the memory channels 212-2 to 212-*n*.

Memory system 200 may further include a parity memory channel 252. Parity memory channel 252 can be implemented using a single memory device (e.g., a memory die or memory chip), or multiple memory devices. In some implementations, parity memory channel can be implemented as a single memory chip incorporating multiple memory dies. Parity memory channel can be used to store parity bits that are each calculated over a set of data bits in data memory channels 212-1 to 212-$n$. In some implementations, parity memory channel 252 can be of the same size as each of data memory channels 212-1 to 212$n$. For example, parity memory channel 252 can implemented using a memory component or a combination of memory components that have an equivalent size as that of a data memory channel, or parity memory channel can be implemented as a partition or a section of a larger memory channel.

Each parity bit stored in parity memory channel 252 can be calculated over a corresponding set of data bits in data memory channels 212-1 to 212-$n$. For example, the parity bit at a location in parity memory channel 252 can be a odd or even parity calculation over a corresponding data bit at the same location in each of data memory channels 212-1 to 212-$n$. Hence, as shown in FIG. 2, parity bit 255 can be a parity calculation computed over data bit 215-1 in memory channel 212-1, data bit 215-2 in memory channel 212-2, to data bit 215-$n$ in memory channel 215-$n$. In this manner, the ECC can be used to protect data bits within a memory channel, whereas the parity protection can be used to protect data bits across the multiple memory channels. In some implementations, the parity protection can also be extended to the ECC and/or metadata stored in data memory channels 212-1 to 212-$n$. For example, parity bit 257 can be calculated over ECC data bit 217-1 in memory channel 212-1, ECC data bit 217-2 in memory channel 212-2, to ECC data bit 217-$n$ in memory channel 212-$n$.

Other variations of the parity bits can also be implemented. For example, the set of data bits over which a particular parity bit is calculated need not be at the same location in each memory channel. The location of the data bit in each memory channel can be determined algorithmically such as by adding an offset for the corresponding memory channel to a base location. A parity bit can also be calculated over more than one data bit from a memory channel as long as each data bit in the set of data bits corresponding to the parity bit is protected by a different ECC. The number of parity bits also need not be equal to the number of data bits in each memory channel. For example, the number of parity bits can be half the number of data bits in each memory channel if each parity bit is calculated over two data bits from each memory channel.

During operation, when data (e.g., a data word) is read from a memory channel, the ECC corresponding to the data is also read. A set of error correction bits can be computed from the data read from the memory channel and compared with the ECC. If the set of error correction bits computed from the data read from the memory channel matches the ECC, the data can be outputted as is because no errors are detected. If the set of computed error correction bits does not match the ECC, but the error is limited to a correctable error (e.g., a single-bit error) as indicated by the comparison, the data read from the memory channel can be corrected by inverting the erroneous bit(s), and the corrected data can be outputted.

In some scenarios, the data read from the memory channel may contain an error that is uncorrectable by the ECC. For example, the data read from the memory channel may contain a multibit error, or may include a number of error bits that exceed the capability of the ECC. Such an error can be detected, for example, when multiple bits of the ECC mismatch the computed set of error correction bits. When an uncorrectable error occurs, a set of parity bits associated with the data that was read from the memory channel is retrieved, and all data bits that were used to compute that set of parity bits are also retrieved. For example, if the data read from a memory channel is a 16-bit data word, and the ECC associated with the 16-bit data word indicates the 16-bit data word has an uncorrectable error, 16 parity bits corresponding to the 16-bit data word can be retrieved. In addition to the 16-bit data word already read from the memory channel, a corresponding 16-bit data word from each of the other memory channels that were used in calculation of the 16 parity bits can also be read from the other memory channels. Having read a 16-bit data word from each of the memory channels, 16 parity check bits can be computed from the 16-bit data words, and be compared with the 16 parity bits retrieved from memory. Those of the parity bits that mismatch with the computed parity check bits can indicate which bits of the 16-bit data word originally read from the memory channel is erroneous. The erroneous bits can then be inverted to recover the correct 16-bit work, and the recovered 16-bit word can be outputted.

Figure 3:
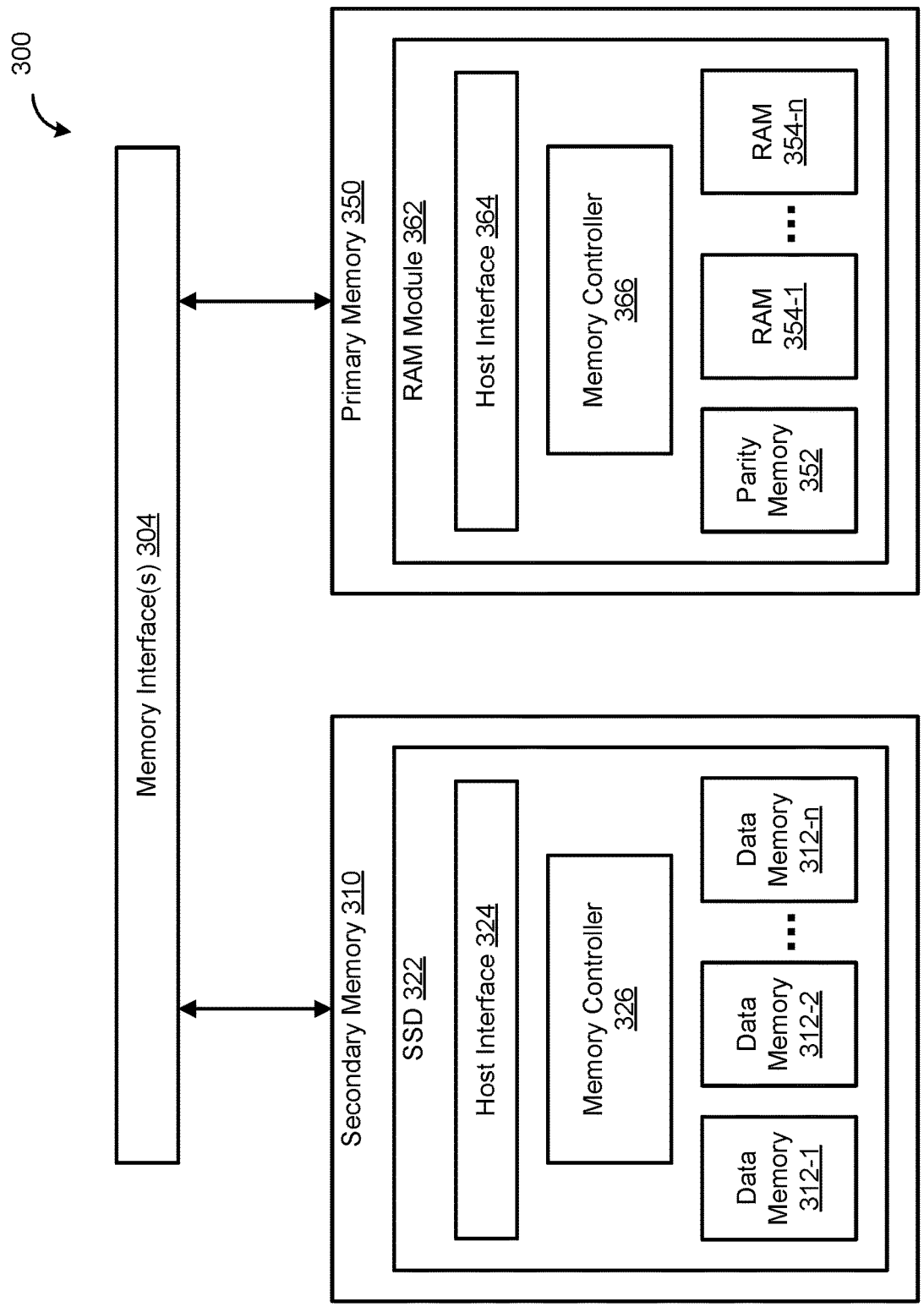
FIG. 3 illustrates a simplified block diagram of an example of an implementation of a memory system in a computing system.

FIG. 3 illustrates a block diagram of part of a computing system 300 having parity protection for enhanced reliability, according to some implementations. Computing system 300 may include components not specifically shown such as those of computing system 100 described above. The memory system of computing system 300 may include primary memory 350 and secondary memory 310.

Primary memory 350, which may also be referred to as host memory, may include memory devices that are located close to the host processor on a motherboard to enable the host processor to quickly access data from primary memory 350. Primary memory 350 can be used to store data that the host processor needs imminently. For example, primary memory 350 may include volatile random access memories such as SRAM, DRAM, and the like. As compared to secondary memory 310, such memory components of primary memory 350 can provide faster access times, but are typically smaller in storage capacity and more expensive. Primary memory 350 may also include non-volatile memories such as PROM, EEPROM, flash memory, and the like to store firmware or boot code used during startup of computing system 300. Secondary memory 310 may include memory devices located in a separate storage device that is coupled to the computing system 300 directly or via a network. Secondary memory 319 may include non-volatile storage devices such as HDD, SSD, or other lower cost mass storage.

Referring to FIG. 3, computing system 300 may include SSD 322 as a component of secondary memory 310. SSD 322 can be considered as a memory or storage device, and may include one or more data memory channels 312-1 to 312-$n$. Data memory channels 312-1 to 312-$n$ may include one or more memory dies or memory chips, and can be implemented using an emerging memory technology such as 3DXP. In some implementations, data memory channels 312-1 to 312-$n$ can also be implemented using a mature memory technology such as flash memory, or a combination of emerging and mature memory technologies. Data memory channels 312-1 to 312-$n$ can be used to store data, corresponding ECC information, and optionally metadata as discussed above.

In some implementations, SSD 322 may include a host interface 324 to communicate with memory interface(s) 304 of computing system 300 and a memory controller 326. Host interface 324 can be implemented, for example, using SATA, SAS, PCIe, DDR, or other suitable interfaces. Memory controller 326 may perform functions such as handling I/O requests received from computing system 300, ensuring data integrity and efficient storage, and managing the underlying memory channels. For example, memory controller 326 may schedule memory access requests, perform address translation, perform garbage collection, etc. In some implementations, memory controller 326 may perform error correction by managing the ECC store in the underlying data memory channels 312-1 to 312-n.

Computing system 300 may also include a RAM module 362 as a component of primary memory 350. RAM module 362 may include a host interface 364 implemented using DIMM, PCIe, or other suitable interface. RAM module 362 may also include a memory controller 366 to manage the memory channels of RAM module 362. Memory controller 366 may perform functions similar to those of memory controller 326. In addition, memory controller 366 may perform refresh cycles to the memory channels as needed to retain the data stored in RAM module 362.

RAM module 362 may include multiple memory channels include a parity memory channel 352 and RAM channels 354-1 to 354-n. Each memory channel may include one or more memory dies or memory chips, and can be implemented using a memory technology with fast access times suitable for primary memory 350 such as DRAM, SRAM, or the like. Parity memory channel 352 can be a dedicated memory channel used to store parity bits computed over data stored in SSD 322, whereas RAM channels 354-1 to 354-n can be used by computing system 300 for general data storage. In some implementations, the parity bits stored in parity memory channel 352 can themselves be protected using ECC stored in RAM module 362. In some implementations, the parity bits need not be stored in a dedicated memory channel, and can be distributed across one or more memory channels of RAM module 362.

During operation, when computer system 300 reads data stored in one of data memory channels 312-1 to 312-n of SSD 322, memory controller 326 can perform ECC data integrity checking of the data and perform error correction for correctable errors before outputting the data to memory interface(s) 304. In some implementations, the ECC data integrity check can be performed by a memory controller external to SSD 322, by the host processor of computing system 300, or by a requester of the data such as an acceleration engine. When an uncorrectable error is encountered, memory controller 326 may notify the host processor (not shown) of computing system 300 that the data being read contains an uncorrectable error. The host processor may then read a set of parity bits from parity memory channel 352 and perform a recovery process to recover the proper data being read. For example, the host processor may read additional data from SSD 322 that are used to calculate the parity bits, compute a set of parity check bits from the data read from SSD 332, and compare the computed parity check bits with the parity bits stored in parity memory channel 352 to determine which of the data bits in the original data read from the data memory channel is erroneous. Once identified, the erroneous data bits can then be inverted to recover the proper data. In some implementations, the recovery process can be performed by memory controller 326 or by the requester of the data such as an acceleration engine.

According, the incorporation of parity protection in addition to ECC can improve the reliability of SSD 332 because errors uncorrectable by ECC can be recovered with the parity protection. In implementations in which SSD 322 employs an emerging memory technology such as 3DXP, storing the parity bits separately in primary memory 350 instead of SSD 322 can further improve reliability because the parity bits are stored using a more mature memory technology. Storing the parity bits separately in primary memory 350 instead of SSD 322 can also improve write access times, because the parity bits can be written faster to primary memory 350 than to SSD 322.

Figure 4:
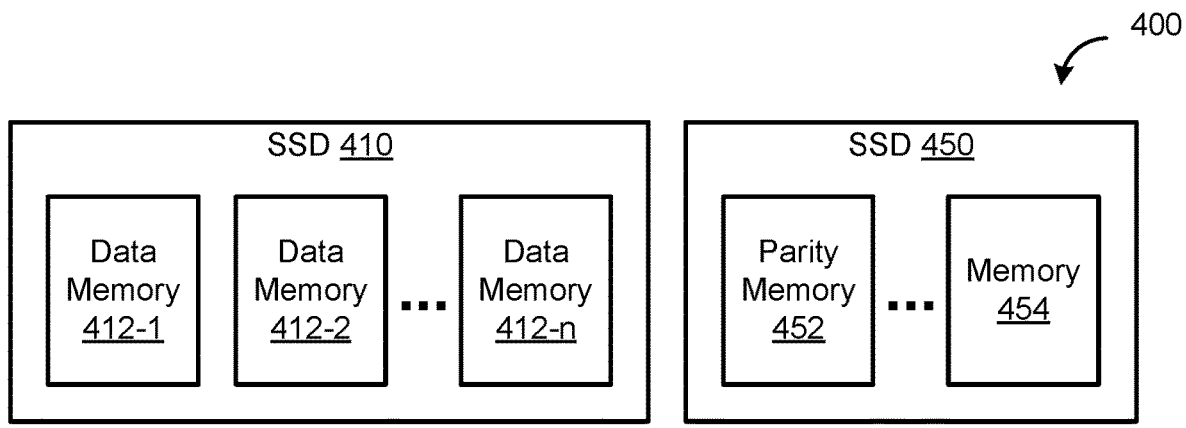
FIG. 4 illustrates a simplified block diagram of another example of a memory system.

FIG. 4 illustrates a memory system 400 with parity protection using a different arrangement of memory channels, according to some implementations. Memory system 400 differs from that shown in FIG. 3 by storing the parity protection in a SSD 450 instead of RAM module 362. Both SSD 410 and SSD 450 can be, for example, part of the secondary memory of a computing system. SSD 410 can be implemented using an emerging memory technology, and SSD 450 can be implemented using a mature memory technology such as flash memory. Each of SSD 410 and SSD 450 may include additional components not specifically shown, such as a memory controller.

Figure 5:
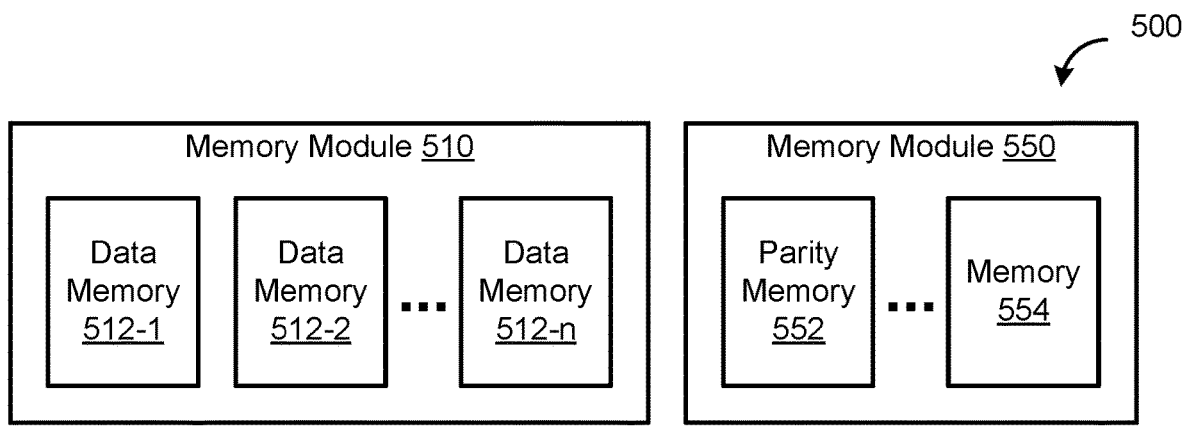
FIG. 5 illustrates a simplified block diagram of a further example of a memory system.

In some implementations, the emerging memory technology may be a volatile type of memory, and thus may not be suitable for SSD applications. Such a memory may be more suitable for a memory module that is used as part of the primary memory of a computing device. FIG. 5 illustrates an example of a memory system 500 in which the data memory channels 512-1 to 512-n of a memory module 510 are implemented using an emerging memory technology. In such implementations, the parity protection can be stored, for example, in a parity memory channel 552 of a separate memory module 550 implemented using a mature memory technology such as DRAM or SRAM. The parity protection can also be stored in a parity memory channel of a SSD implemented with a mature memory technology such as flash memory.

Figure 6:
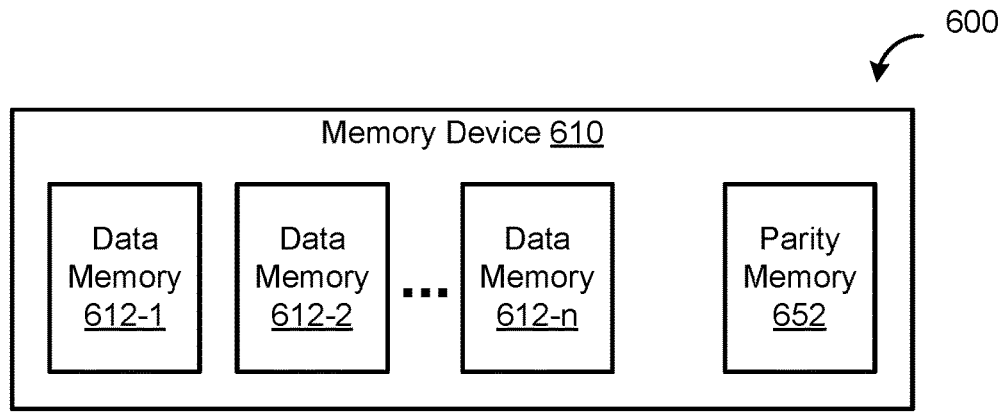
FIG. 6 illustrates a simplified block diagram of an example of a memory device in a memory system.

The parity protection has thus far been described as being stored in a memory device separate from the data memory channels, such as a separate SSD or a separate memory module. In some implementations, the parity protection can be incorporated into the same memory device as the data memory channels. FIG. 6 illustrates a memory system 600 having a memory device 610. Memory device 610 can be, for example, a SSD that is part of the secondary memory of a computing system, or a memory module that is part of the primary memory of a computing system. Memory device 610 may include one or more data memory channels 612-1 to 612-n implemented using an emerging memory technology, and a parity memory channel 652 implemented using the a mature memory technology. The memory channels can be integrated on the same printed circuit board or package such as a DIMM module, SSD, etc., and one or more memory controllers (not shown) can be used to manage the different types of memory in memory device 610. In some implementations, parity memory channel 652 can also be implemented using the emerging memory technology.

FIGS. 7-10 illustrate examples of methods for enhancing the reliability of a memory system. These methods may be implemented by the systems described above, such as for example those shown in FIGS. 1-6.

Figure 7:
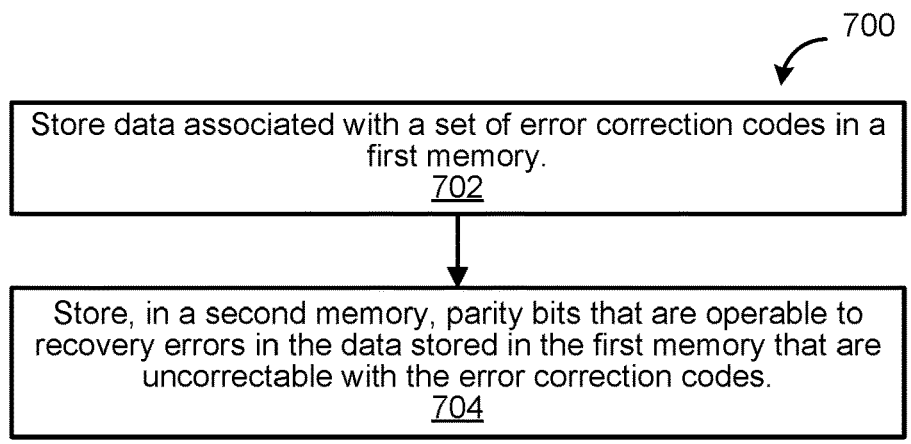
FIG. 7 illustrates a flow diagram of an example of a process for storing information.

FIG. 7 illustrates a process 700 for enhancing the reliability of a memory system, according to some implementations. The memory system may include a first memory for storing data and a second memory for storing parity information associated with the data stored in the first memory. Each memory can be implemented using one or more memory dies, one or more memory chips, one or more memory packages, one or more memory devices such as memory modules, storage drives, etc. The memory system can be part of a computing system having one or more host processors. The memory system can be accessed by the host processor(s) and/or other components of the computing system including acceleration engines such as GPUs, DMA engines, and the like. The memory system can also be part of a networked storage system that can be accessed by network connected devices and/or computing systems.

In some implementations, the first memory and the second memory can be implemented using different memory technologies. For example, the first memory can be implemented using an emerging memory technology such as 3DXP, and the second memory can be implemented using a more mature memory technology such as DRAM. It should be understood that the first and second memories can be implemented using other variations and/or combinations of memory technologies. In some implementations, the access time (e.g., read latency, and/or write latency, etc.) of the second memory can be faster than the first memory. In some implementations, the first memory can be a non-volatile memory, and the second memory ca be a volatile memory, or vice versa. Both the first and second memories can also be volatile memories, or both can be non-volatile memories.

Process 700 may begin at block 702 by storing data associated with a set of error correction codes in the first memory. In some implementations, the first memory can be organized into multiple memory channels. Each of the memory channels can be implemented using one or more memory dies or chips, and may include multiple memory blocks. Each memory channel can be configured to store data as well as error correction codes for that data within the memory channel. Each error correction code can be computed over a set of data bits such as a data word, and can be stored contiguously with the corresponding set of data bits (e.g., appending the error correction code to the data word). In some implementations, a region of the memory channel (e.g., a memory block) can be designated for storing the error correction codes. In some implementations, each memory channel may also store metadata associated with the data stored therein.

At block 704, process 700 may store parity bits in the second memory. The parity bits are computed over data bits in the first memory, and are operable to recovery errors in the data stored in the first memory that are uncorrectable with the error correction codes. These uncorrectable errors may include multi-bit errors in a data word, or a data word having a number of erroneous data bits that exceed the capability of the error correction code. Each parity bit can be computed over a corresponding set of data bits stored in the first memory. For example, an odd parity bit can be computed over a data bit at a corresponding location from each of the memory channels of the first memory, or an even parity bit can be computed over a data bit at a corresponding location from each of the memory channels of the first memory. The recovery process when an uncorrectable error is encountered will be described further below with reference to FIG. 10.

Figure 8:
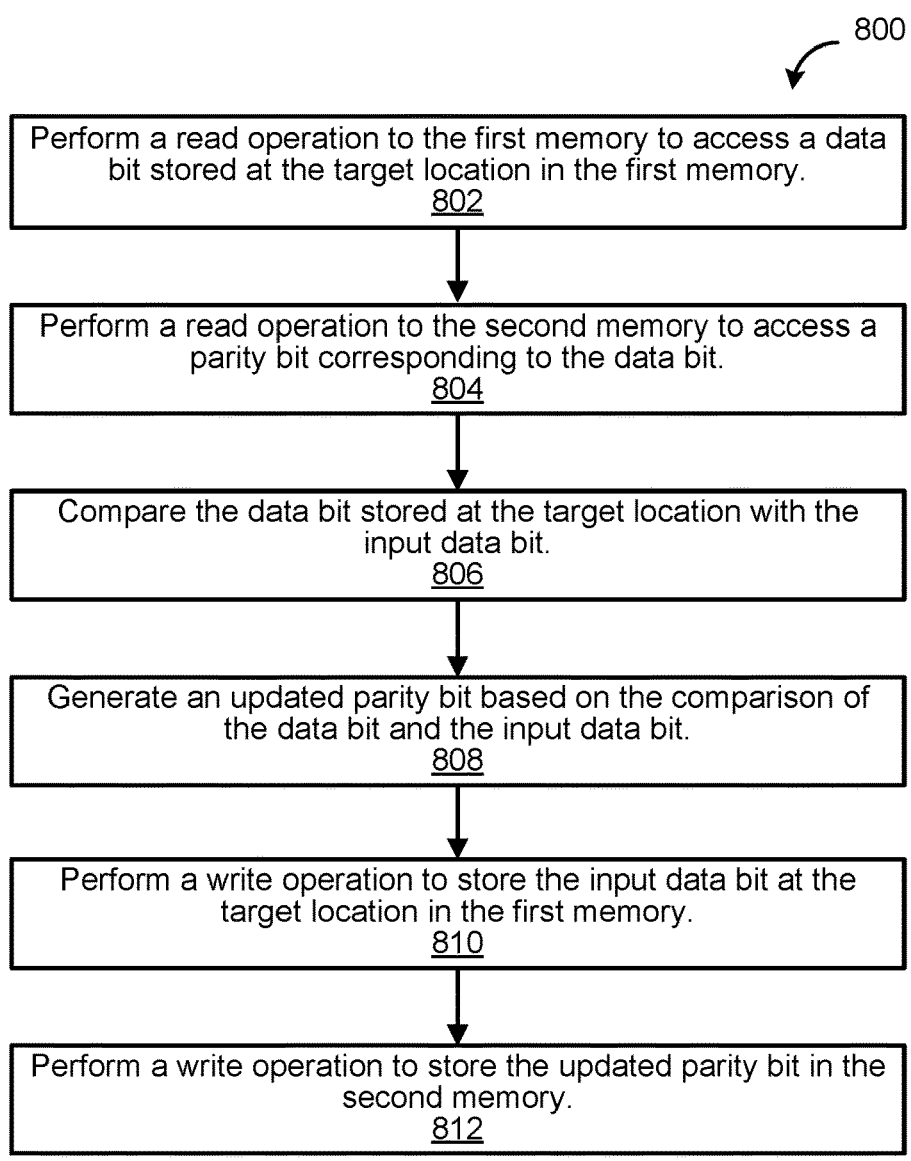
FIG. 8 illustrates a flow diagram of an example of a process for performing a memory write.

FIG. 8 illustrates a flow diagram of a process 800 to perform a memory write to write an input data bit at a target location in the first memory of the memory system, according to some implementations. Process 800 can be performed by a host processor, an acceleration engine, a memory controller, or other components that can access the memory system. In order to modify data stored in the memory system, the memory write may involve read-modify-write operations. Furthermore, because the stored data is being modified, the corresponding error correction code and parity information may also need to be modified.

Process 800 may begin at block 802 by performing a read operation to the first memory to access a data bit stored at the target location in the first memory. In some implementations, the first memory may be bit addressable, for example, when the first memory is implemented using a memory technology such as 3DXP. In such implementations, a memory controller or other access requester may be able to address and write an individual bit in the first memory. In systems in which the first memory is data byte or word addressable, reading a data bit may involve reading an entire data byte or word stored at the target location in the first memory.

At block 804, a read operation to the second memory can be performed to access a parity bit corresponding to the data bit being modified. For example, the parity bit can be stored at the same location in the parity memory channel as the location of the data bit being modified in the data memory channel, and thus the read operation can read the parity memory channel using the same address as the target location in the data memory channel. In implementations in which the second memory is data byte or word addressable, reading the parity bit may involve reading a parity byte or word corresponding to the data byte or word containing the data bit being modified.

At block 806, the data bit stored at the target location is compared with the input data bit. In memory systems that are byte or word addressable, each bit of the data byte or word can be compared with a corresponding bit of the input data byte or word to determine which of the input data bits being written into the first memory are different than the previously stored data at the target location. The bit or bit-by-bit comparison can be performed, for example, using an XOR gate or performing a XOR operation.

At block 808, an updated parity bit can be generated based on the comparison of the previously stored data bit at the target location and the input data bit. If the input data bit has the same value as the previously stored data bit, then the parity bit corresponding to the data bit at the target location need not be modified. If the input data bit has a different value than the previously stored data bit, then the parity bit can be updated by inverting the previously stored parity bit. In data byte or word addressable systems, the operation may include, for each bit that is different between the data word and the input data word, inverting a corresponding parity bit of the parity word to generate an updated parity word. It should be noted that although the parity bit being updates is computed over a data bit from each of the data memory channels, it is unnecessary to read the data from the other memory channels because the nature of the parity computation allows the updated parity value to be determined by examining only the data that is being modified or updated.

At block 810, a write operation is performed to store the input data bit at the target location in the first memory. In data byte or word addressable systems, this may involve writing an entire input data byte or data word at the target location. Next, if the parity bit corresponding to the target location needs to be updated, a write operation can be performed at block 812 to store the updated parity bit in the second memory. In data byte or word addressable systems, this may involve writing an entire updated parity byte or word in the second memory. The memory write process may also include generate an updated error correction code based on the input data, and performing a write operation to store the updated error correction code in the first memory.

In implementations in which the second memory has a faster read and/or wrote access time than the first memory, process 800 can improve the wrote bandwidth of the memory system because the parity information can be updated faster than if the parity information is stored in the slower first memory. Even in implementations in which the second memory storing the parity information may not be faster than the first memory storing the protected data, the performance of the memory system can still be improved with process 800, because the parity update can be performed on a separate interface. This allows the first memory to continue servicing access requests as soon as the read-modify-write to store the input data in the first memory completes. For example, the next read or write access to the first memory can be performed while the system is updating the parity information in the second memory to maintain maximum access bandwidth on the first memory.

Figure 9:
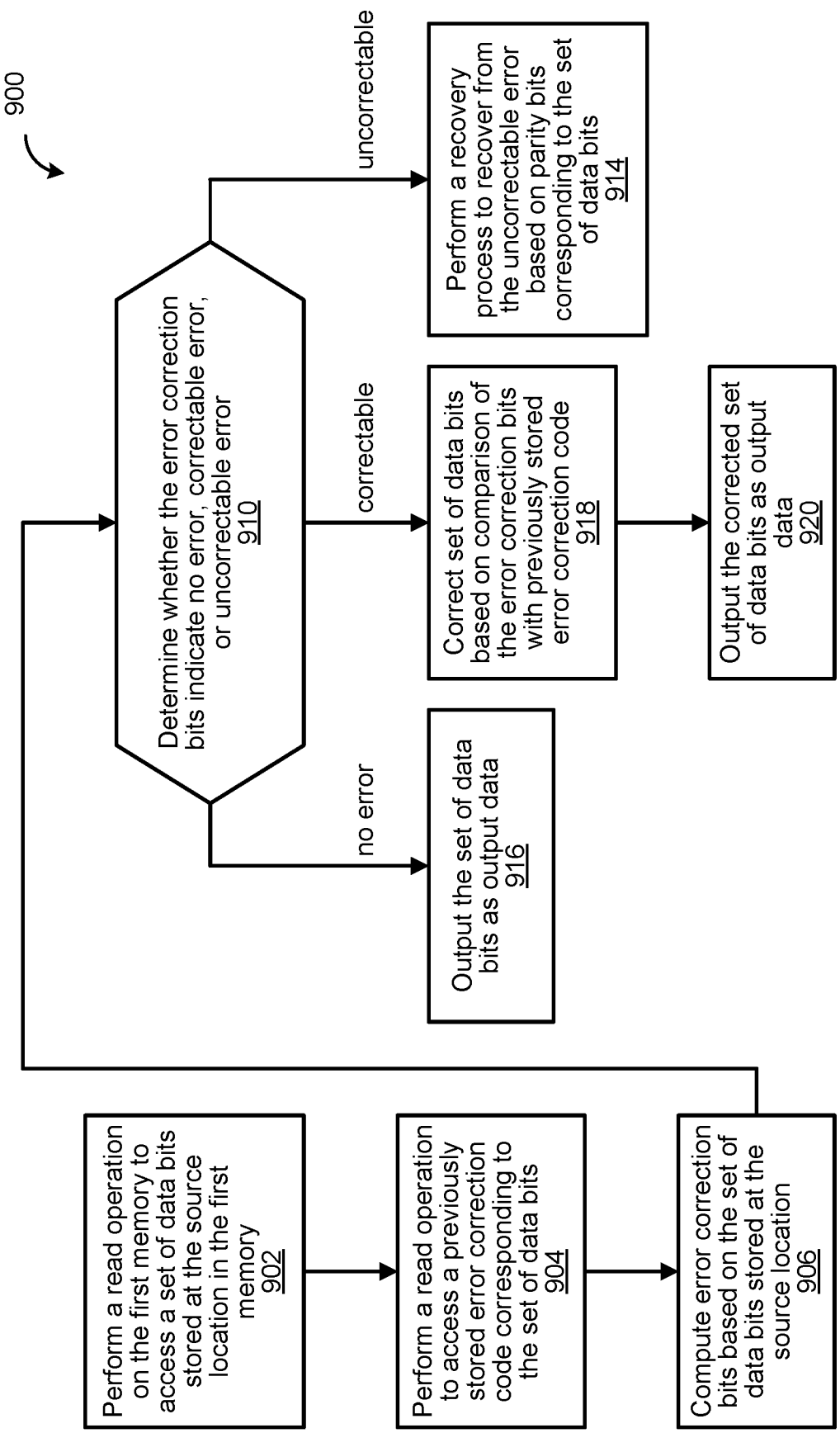
FIG. 9 illustrates a flow diagram of an example of a process for performing a memory read.

FIG. 9 illustrates a flow diagram of a process 900 to perform a memory read to read a set of data bits at a source location in the first memory of the memory system, according to some implementations. Although some systems may be bit addressable, the ECC data integrity check may require a set of data bits to be read out to detect and correct errors. As such, process 900 will be described as read a set of data bits such as a data byte or data word. Similar to process 800, process 900 can be performed by a host processor, an acceleration engine, a memory controller, or other components that can access the memory system.

Process 900 may begin at block 902 by performing a read operation on the first memory to access a set of data bits stored at the source location in the first memory. The read operation may include selecting a data memory channel in the first memory in which the data is stored. The set of data bits can be a data byte, a data word, or a group of data bits protected by a particular error correction code to be outputted to a requester of the data. At block 904, a read operation is performed to access the previously stored error correction code corresponding to the set of data bits. In some implementations, depending on the size of the grouping of data bits, the data bus width of the system, and whether the error correction code is stored contiguous with the protected data, the set of data bits and the corresponding error correction code can be read in one read operation.

Next, an ECC data integrity check process can be initiated to determine if the set of data bits read from the first memory contains any errors. At block 906, error correction bits based on the set of data bits stored at the source location can be computed. For example, each error correction bit can be computed from a different combination of a subset of the data bits. At block 910, a determination is made as to whether the computed error correction bits indicate that the data read from the first memory has no error, a correctable error, or an uncorrectable error by comparing the newly computed error correction bits with the previously stored error correction code read from the first memory. If the computed error correction bits match the previously stored error correction code, the set of data bits read from the first memory can be outputted as output data at block 916 without any modification because no errors are detected in the read data.

At block 918, if it is determined that the set of data bits has a correctable error based on the comparison of the error correction bits with the previously stored error correction code (e.g., the location of the erroneous bit(s) can be identified using ECC), then the set of data bits can corrected based on the ECC comparison. For example, the erroneous bit(s) identified from the ECC comparison can be inverted to correct the set of data bits. Then at block 920, the corrected set of data bits can be outputted as output data. If it is determined that the set of data bits has an uncorrectable error based on the comparison of the error correction bits with the previously stored error correction cod, then a recovery process can be performed at block 914 to recover from the uncorrectable error based on parity bits in the second memory corresponding to the set of data bits being read.

Figure 10:
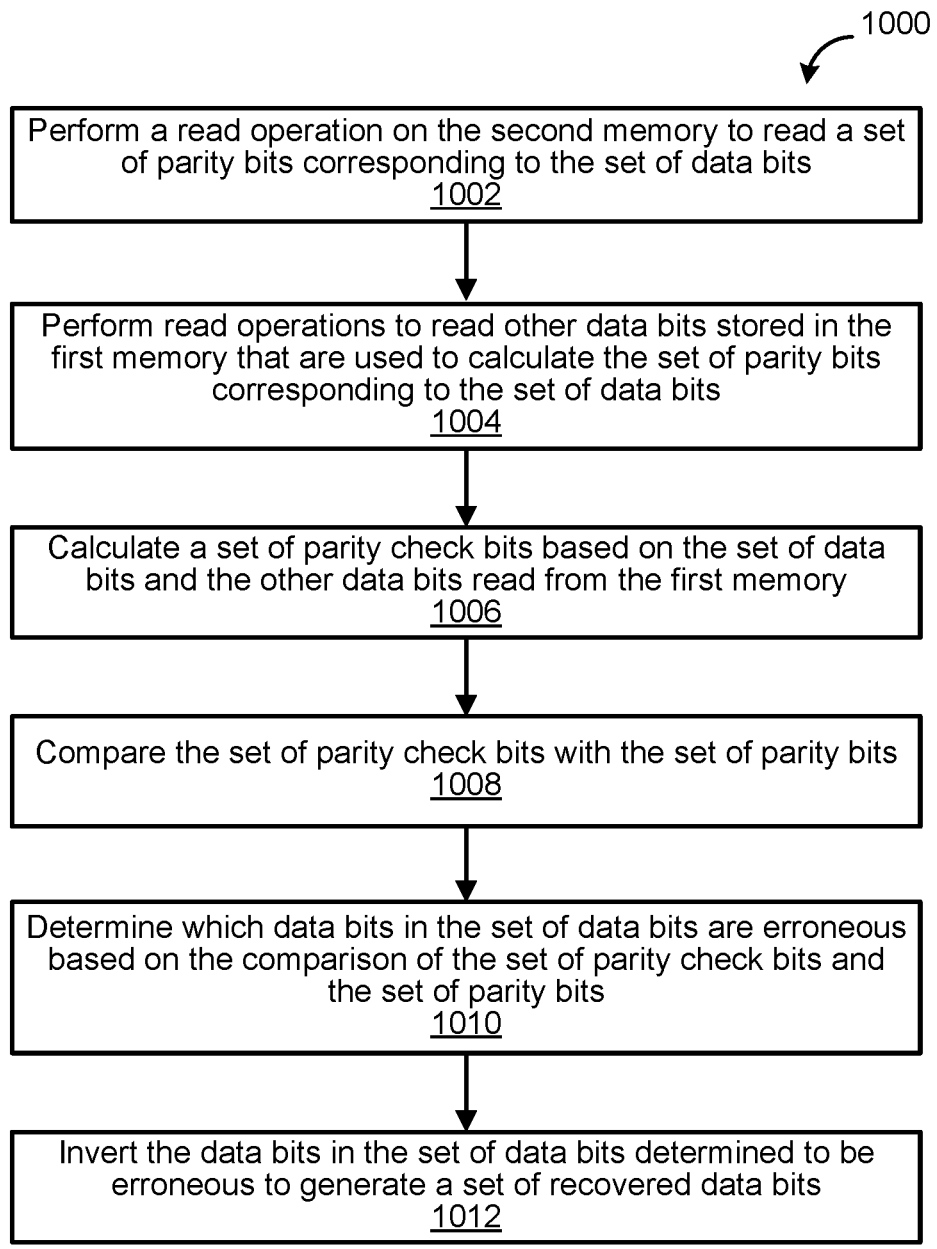
FIG. 10 illustrates a flow diagram of an example of a process for recovering an uncorrectable error.

FIG. 10 illustrates a flow diagram of a process 1000 to recover the proper data bits when reading data having an uncorrectable error, according to some implementations. Process 1000 can be performed, for example, by a host processor, an acceleration engine, a memory controller, or other components that can access the memory system. It should be noted that in some implementations, process 900 need not be performed by the same component as the component performing process 800 or 900. For example, processor 800 and/or 900 can be performed by a memory controller, and process 1000 can be performed by a host processor or other component.

Process 1000 may begin by performing a read operation on the second memory at block 1002 to read a set of parity bits from the second memory corresponding to the set of data bits read from the first memory. The number of parity bits can be the same as the number of bits in the set of data bits, and the location of the parity bits can be at the same location in the second memory as where the set of data bits is located in the first memory. At block 1004, one or more read operations can be performed to read other data bits stored in the first memory that are used to calculate the set of parity bits corresponding to the set of data bits. For example, if the set of data bits is a data word at a certain address in a selected memory channel, a data word at the corresponding address in each of the other memory channels can be read, because these data words collectively with the data word in the selected memory channel are used to compute the set of parity bits.

Next, at block 1006, a set of parity check bits is calculated based on the set of data bits and the other data bits read from the first memory. For example, each of the parity check bit can a result of performing a parity calculation on a corresponding data bit from each of the memory channels in the first memory. At block 1008, the set of computed parity check bits is compared with the set of parity bits previously stored in the second memory. At block 1010, a determination is made as to which data bits in the set of data bits are erroneous based on the comparison of the set of parity check bits and the set of parity bits. Depending on which of the parity bits mismatches, the location of erroneous data bits can be determined. For example, if a 16-bit data word is being read, and the parity bits corresponding to bits 2, 5, and 13 of the 16-bit data word mismatches with the computed parity check bits, then bits 2, 5, and 13 can be determined to be erroneous. At block 1012, the data bits in the set of data bits determined to be erroneous can be inverted to generate a set of recovered data bits, and the set of recovered data bits can be used as the read data.

Accordingly, by including parity protection in addition to ECC protection, errors uncorrectable by ECC can be recovered using the parity bits. Furthermore, by storing the parity protection in a different memory, die level or other types of defects affecting the memory storing the data will not corrupt the parity protection information stored in a separate memory. The techniques described herein can enhance the reliability of systems utilizing emerging memory technologies. It should also be noted that the techniques described herein can also be employed in mature memory technologies to improve their reliability by providing the capability to recover errors that are uncorrectable by error correction codes.

Figure 11:
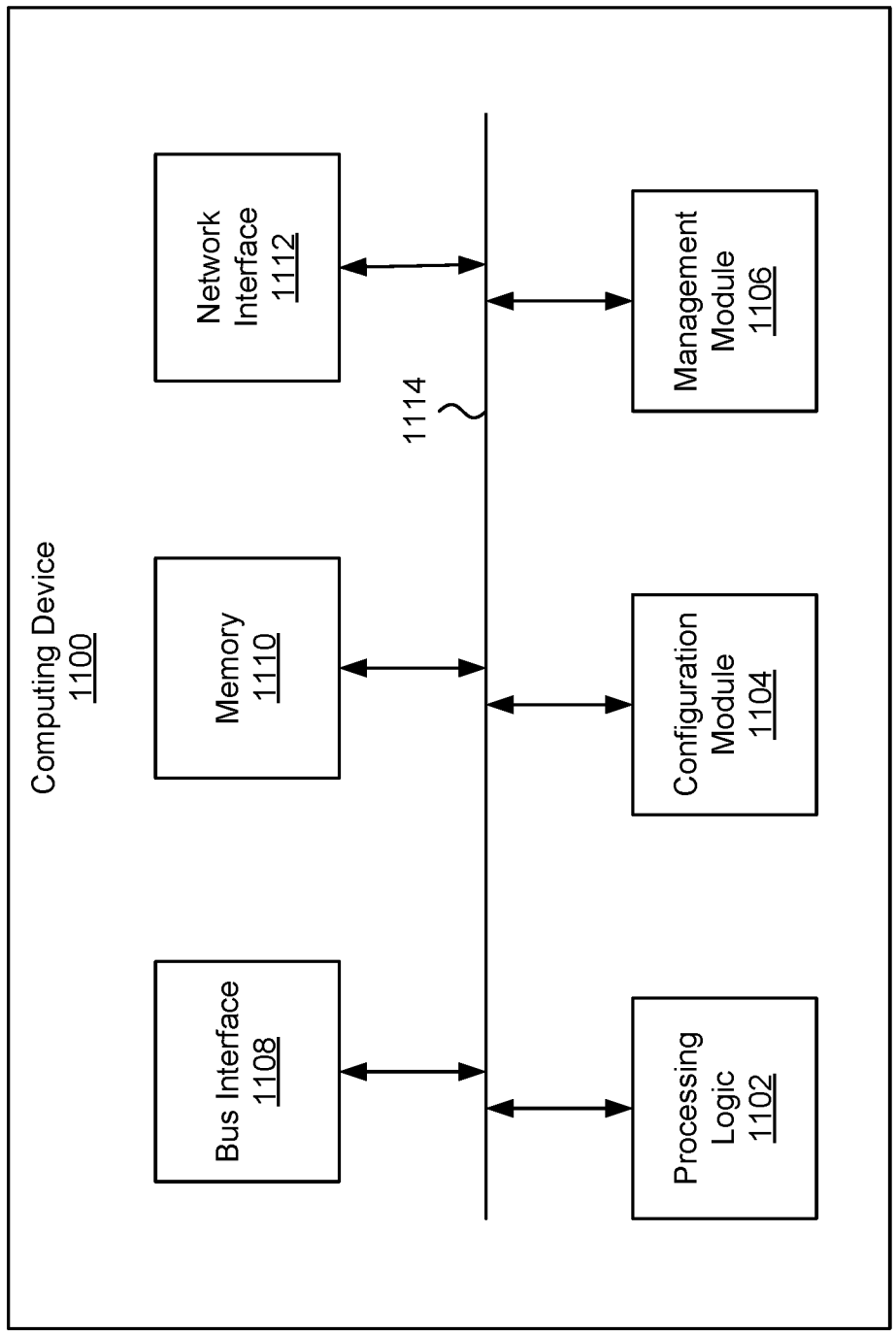
FIG. 11 illustrates an example of a computing device, according to certain aspects of the disclosure.

FIG. 11 illustrates an example of a computing device 1100. Functionality and/or several components of the computing device 1100 may be used without limitation with other embodiments disclosed elsewhere in this disclosure, without limitations. A computing device 1100 may facilitate processing of packets and/or forwarding of packets from the computing device 1100 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 1100 may be the recipient and/or generator of packets. In some implementations, the computing device 1100 may modify the contents of the packet before forwarding the packet to another device. The computing device 1100 may be a peripheral device coupled to another computer device, a switch, a router or any other suitable device enabled for receiving and forwarding packets.

In one example, the computing device 1100 may include processing logic 1102, a configuration module 1104, a management module 1106, a bus interface module 1108, memory 1110, and a network interface module 1112. These modules may be hardware modules, software modules, or a combination of hardware and software. In certain instances, modules may be interchangeably used with components or engines, without deviating from the scope of the disclosure. The computing device 1100 may include additional modules, not illustrated here, such as components discussed with respect to the nodes disclosed in FIG. 12. In some implementations, the computing device 1100 may include fewer modules. In some implementations, one or more of the modules may be combined into one module. One or more of the modules may be in communication with each other over a communication channel 1114. The communication channel 1114 may include one or more busses, meshes, matrices, fabrics, a combination of these communication channels, or some other suitable communication channel.

The processing logic 1102 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1102 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1102 may be stored on a computer-readable storage medium, for example, in the form of a computer program. The computer-readable storage medium may be non-transitory. In some cases, the computer-readable medium may be part of the memory 1110.

The memory 1110 may include any of the variations of memory systems described herein and may include either volatile or non-volatile, or both volatile and non-volatile types of memory. The memory 1110 may, for example, include random access memory (RAM), read only memory (ROM), Electrically Erasable Programmable Read-Only Memory (EEPROM), flash memory, and/or some other suitable storage media. In some cases, some or all of the memory 1110 may be internal to the computing device 1100, while in other cases some or all of the memory may be external to the computing device 1100. The memory 1110 may store an operating system comprising executable instructions that, when executed by the processing logic 1102, provides the execution environment for executing instructions providing networking functionality for the computing device 1100. The memory may also store and maintain several data structures and routing tables for facilitating the functionality of the computing device 1100.

In some implementations, the configuration module 1104 may include one or more configuration registers. Configuration registers may control the operations of the computing device 1100. In some implementations, one or more bits in the configuration register can represent certain capabilities of the computing device 1100. Configuration registers may be programmed by instructions executing in the processing logic 1102, and/or by an external entity, such as a host device, an operating system executing on a host device, and/or a remote device. The configuration module 1104 may further include hardware and/or software that control the operations of the computing device 1100.

In some implementations, the management module 1106 may be configured to manage different components of the computing device 1100. In some cases, the management module 1106 may configure one or more bits in one or more configuration registers at power up, to enable or disable certain capabilities of the computing device 1100. In certain implementations, the management module 1106 may use processing resources from the processing logic 1102. In other implementations, the management module 1106 may have processing logic similar to the processing logic 1102, but segmented away or implemented on a different power plane than the processing logic 1102.

The bus interface module 1108 may enable communication with external entities, such as a host device and/or other components in a computing system, over an external communication medium. The bus interface module 1108 may include a physical interface for connecting to a cable, socket, port, or other connection to the external communication medium. The bus interface module 1108 may further include hardware and/or software to manage incoming and outgoing transactions. The bus interface module 1108 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1108 may include the physical layer for any of these bus protocols, including a connector, power management, and error handling, among other things. In some implementations, the computing device 1100 may include multiple bus interface modules for communicating with multiple external entities. These multiple bus interface modules may implement the same local bus protocol, different local bus protocols, or a combination of the same and different bus protocols.

The network interface module 1112 may include hardware and/or software for communicating with a network. This network interface module 1112 may, for example, include physical connectors or physical ports for wired connection to a network, and/or antennas for wireless communication to a network. The network interface module 1112 may further include hardware and/or software configured to implement a network protocol stack. The network interface module 1112 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1100 may include multiple network interface modules, each configured to communicate with a different network. For example, in these implementations, the computing device 1100 may include a network interface module for communicating with a wired Ethernet network, a wireless 802.11 network, a cellular network, an Infiniband network, etc.

The various components and modules of the computing device 1100, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 12.

Figure 12:
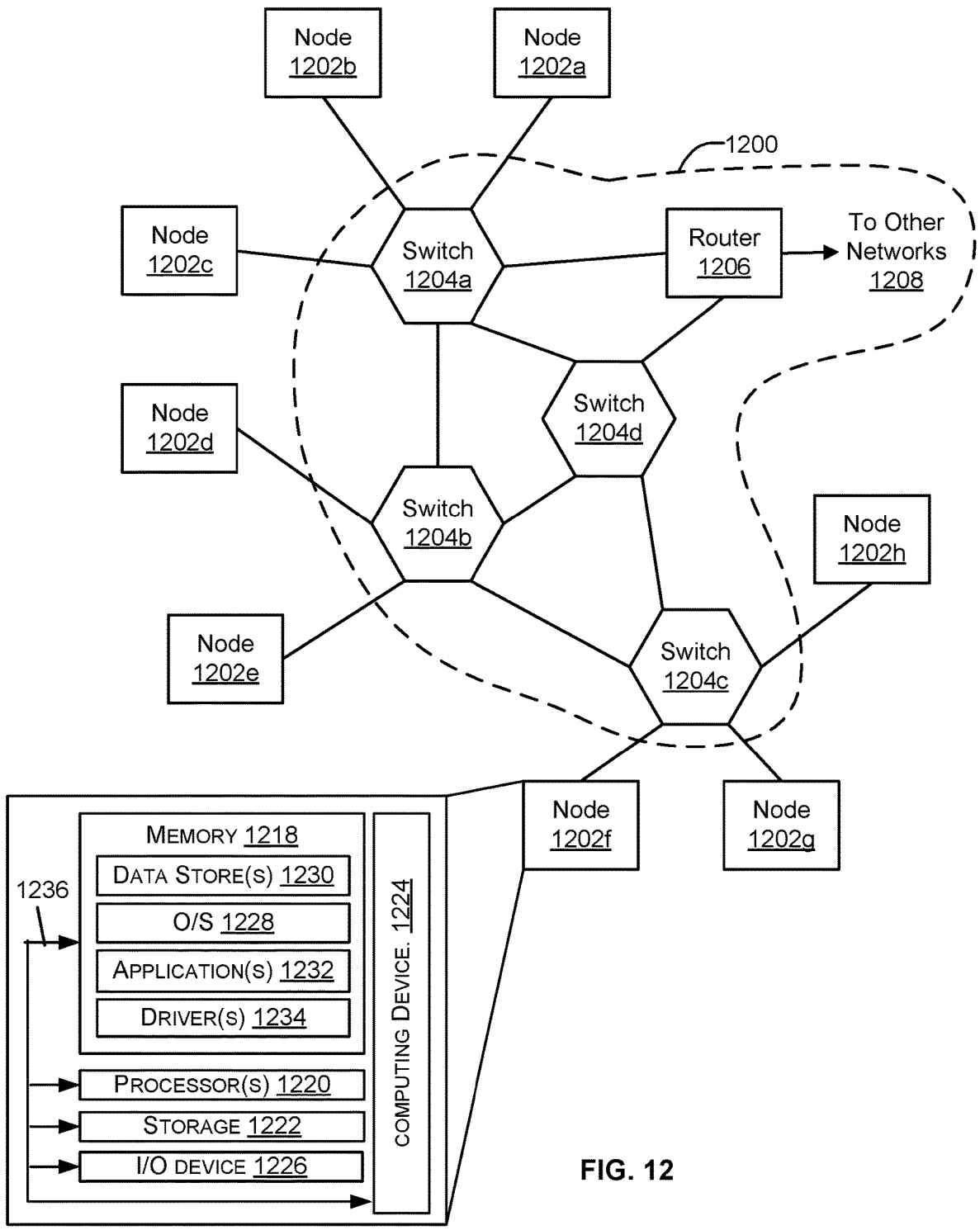
FIG. 12 illustrates an example architecture for features and systems described herein that includes one or more service provider computers and/or a user device connected via one or more networks, according to certain aspects of the disclosure.

FIG. 12 illustrates a network 1200, illustrating various different types of computing devices 1100 of FIG. 11, such as nodes comprising computing device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A computing device 1100 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more computing devices 1100 for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers).

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, computing device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 1236 may provide a medium over which the various components of the node(s) 1202a-1202h can communicate. The communication channel or channels 1236 may take the form of a bus, a ring, a switching fabric, or a network.

The node(s) 1202a-1202h may also contain computing device(s) 1224 that allow the node(s) 1202a-1202h to communicate with a stored database, another computing device or server, user terminals and/or other devices on the network(s) 1200. The computing device(s) 1224 of FIG. 12 may include similar components discussed with reference to the computing device 1100 of FIG. 11.

In some implementations, the computing device 1224 is a peripheral device, such as a PCI-based device. In these implementations, the computing device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1108 may implement NVMe, and the computing device 1224 may be connected to a computing system using a PCIe interface.

A PCI-based device may include one or more functions. A "function" describes operations that may be provided by the computing device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the computing device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 11, FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   a host processor;
   a first memory having a plurality of memory channels, wherein each of the memory channels is configured to store data and error correction codes for the data stored in a corresponding memory channel; and a second memory configured to store parity bits, wherein each of the parity bits is calculated over a data bit at a corresponding location from each of the memory channels in the first memory, wherein the first memory and the second memory use different memory technologies, such that the error correction codes are stored using a same memory technology as a corresponding data and the parity bits are stored using a different memory technology than the corresponding data, wherein the host processor is configured to write an input data word at a target location in the first memory by performing operations to:

read a data word stored at the target location in the first memory;

read, from the second memory, a parity word corresponding to the data word;

generate an updated parity word based on the parity word, the data word, and the input data word;

write, to the first memory, the input data word at the target location; and write, to the second memory, the updated parity word;

wherein the host processor is further configured to:

determine that an output data word stored in the first memory has an uncorrectable error based on a corresponding error correction code stored in the first memory; and perform a recovery process to recover from the uncorrectable error associated with the output data word by using parity bits stored in the second memory corresponding to the output data word.

2. The computing system of claim 1, wherein the host processor is further configured to:

read the output data word at a source location in a selected memory channel of the first memory and the corresponding error correction code stored in the first memory.

3. The computing system of claim 2, wherein the recovery process includes operations to:

read the parity bits corresponding to the output data word stored in the second memory;

read data words at the corresponding source location from each of the memory channels other than the selected memory channel in the first memory;

calculate a set of parity check bits based on the data words and the output data word read from the first memory;

compare the set of parity check bits with the parity bits corresponding to the output data word to determine which data bits in the output data word is erroneous; and inverting the data bits determined to be erroneous.

4. The computer system of claim 1, wherein the second memory has a faster access time than the first memory.

5. A memory system comprising:

a first memory configured to store data bits and store data associated with a set of error correction codes for the data bits; and a second memory configured to store parity bits, wherein each of the parity bits is calculated over a corresponding group of the data bits in the first memory, wherein the first memory and the second memory use different memory technologies, such that the set of error correction codes are stored using a same memory technology as the corresponding data bits and the parity bits are stored using a different memory technology than the corresponding data bits, wherein the set of error correction codes in the first memory are operable to determine that a set of data bits stored in the first memory has an uncorrectable error by using an error correction code stored in the first memory corresponding to the set of data bits;

wherein the parity bits in the second memory are operable to be used in a recovery process to recover from the uncorrectable error associated with the set of data bits by using a set of parity bits stored in the second memory corresponding to the set of data bits.

6. The memory system of claim 5, wherein a memory write to write an input data bit at a target location in the first memory includes operations to:

perform a read operation to the first memory to access a data bit stored at the target location in the first memory;

perform a read operation to the second memory to access a parity bit corresponding to the data bit;

compare the data bit stored at the target location with the input data bit;

generate an updated parity bit based on the comparison of the data bit and the input data bit;

perform a write operation to store the input data bit at the target location in the first memory; and perform a write operation to store the updated parity bit in the second memory.

7. The memory system of claim 6, wherein the memory write further includes operations to:

generate an updated error correction code based on the input data bit; and perform a write operation to store the updated error correction code.

8. The memory system of claim 5, wherein a memory read to read the set of data bits at a source location in the first memory includes operations to:

perform a read operation on the first memory to access the set of data bits stored at the source location in the first memory;

perform a read operation to access the error correction code corresponding to the set of data bits;

compute error correction bits based on the set of data bits stored at the source location; and compare the error correction bits with the error correction code.

9. The memory system of claim 8, wherein the memory read further includes operations to:

determine that the set of data bits has the uncorrectable error based on the comparison of the error correction bits with the error correction code;

perform a read operation on the second memory to read the set of parity bits corresponding to the set of data bits;

perform read operations to read other data bits stored in the first memory that are used to calculate the set of parity bits corresponding to the set of data bits;

calculate a set of parity check bits based on the set of data bits and the other data bits read from the first memory;

compare the set of parity check bits with the set of parity bits;

determine which data bits in the set of data bits are erroneous based on the comparison of the set of parity check bits and the set of parity bits;

invert the data bits in the set of data bits determined to be erroneous to generate a set of recovered data bits; and output the set of recovered data bits as output data.

10. The memory system of claim 5, wherein the first memory is implemented using non-volatile memory, and the second memory is implemented using volatile memory.

11. The memory system of claim 5, wherein the second memory has a faster access time than the first memory.

12. A method comprising:
 storing data bits in a first memory;
 storing data associated with a set of error correction codes for the data bits in a first memory;
 storing parity bits in a second memory, wherein each of the parity bits is calculated over a corresponding group of the data bits in the first memory, wherein the parity bits in the second memory are operable to recover errors in the data stored in the first memory that are uncorrectable with the error correction codes, and wherein the first memory and the second memory use different memory technologies, such that the set of error correction codes are stored using a same memory technology as the corresponding data bits and the parity bits are stored using a different memory technology than the corresponding data bits;
 determining that a set of data bits stored in the first memory has an uncorrectable error based on an error correction code stored in the first memory corresponding to the set of data bits; and
 performing a recovery process to recover from the uncorrectable error associated with the set of data bits by using a set of parity bits stored in the second memory corresponding to the set of data bits.

13. The method of claim 12, further comprising:
 performing a memory write to write an input data bit to a target location in the first memory, the memory write including:
 performing a read operation to the first memory to access a data bit stored at the target location in the first memory;
 performing a read operation to the second memory to access a parity bit corresponding to the data bit;
 comparing the data bit stored at the target location with the input data bit;
 generating an updated parity bit based on the comparison of the data bit and the input data bit;
 performing a write operation to store the input data bit at the target location in the first memory; and
 performing a write operation to store the updated parity bit in the second memory.

14. The method of claim 12, further comprising:
 performing a memory read to read the set of data bits at a source location in the first memory, the memory read including:
 performing a read operation on the first memory to access the set of data bits stored at the source location in the first memory;
 performing a read operation to access the error correction code corresponding to the set of data bits;
 determining that the set of data bits has the uncorrectable error based on the error correction code;
 performing a read operation on the second memory to read the set of parity bits corresponding to the set of data bits;
 determining which data bits in the set of data bits are erroneous based on the set of parity bits; and
 inverting the data bits in the set of data bits determined to be erroneous to generate a set of recovered data bits.

15. The method of claim 12, wherein the second memory has a faster access time than the first memory.

16. The method of claim 12, wherein the first memory is implemented using non-volatile memory, and the second memory is implemented using volatile memory.

* * * * *